(12) United States Patent
Alim et al.

(10) Patent No.: US 12,468,084 B2
(45) Date of Patent: Nov. 11, 2025

(54) SYSTEMS AND METHODS OF MAKING POLYMERIC OPTICAL LAYERS FOR OPTICAL LAYERING

(71) Applicant: Facebook Technologies, LLC, Menlo Park, CA (US)

(72) Inventors: Marvin Dion Alim, Boulder, CO (US); Richard Farrell, Seattle, WA (US); Matthew E. Colburn, Woodinville, WA (US); Ankit Vora, Bothell, WA (US); Austin Lane, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 766 days.

(21) Appl. No.: 17/701,307

(22) Filed: Mar. 22, 2022

(65) Prior Publication Data

US 2023/0125794 A1   Apr. 27, 2023

Related U.S. Application Data

(60) Provisional application No. 63/271,533, filed on Oct. 25, 2021.

(51) Int. Cl.
*F21V 8/00* (2006.01)
*C08G 18/76* (2006.01)
(Continued)

(52) U.S. Cl.
CPC ....... *G02B 6/0065* (2013.01); *C08G 18/7642* (2013.01); *C08G 75/14* (2013.01);
(Continued)

(58) Field of Classification Search
CPC .............. G02B 6/0065; G02B 6/0018; G02B 2027/0178; G02B 27/017; C08G 18/7642;
(Continued)

(56) References Cited

U.S. PATENT DOCUMENTS 6,472,495 B1 * 10/2002 Yoshimura ......... C08G 18/3876
                                                                    528/73
2007/0054222 A1    3/2007 Gorczyca et al.
2020/0400941 A1* 12/2020 Li ..................... G02B 27/0176

FOREIGN PATENT DOCUMENTS

EP          2269111 A1     1/2011
JP       2004302007 A  * 10/2004
(Continued)

OTHER PUBLICATIONS

International Preliminary Report on Patentability for International Application No. PCT/US2022/047682, mailed May 10, 2024, 9 pages.
(Continued)

*Primary Examiner* — Ryan D Howard
(74) *Attorney, Agent, or Firm* — Greenberg Traurig, LLP

(57) ABSTRACT

The present disclosure relates to systems and methods of making polymeric optical layers for optical layering applications. In an aspect, a waveguide device for a head mounted display is provided. The waveguide device may include a waveguide die having a first refractive index range and a polymeric optical layer. The polymeric optical layer may include a second refractive index range that is different from the first refractive index range and a thiol-containing polymer. For example, the thiol-containing polymer may include thiourethane. In some embodiments, the thiol-containing polymer may be formed from a monomer mixture including a thiol-containing compound and an isocyanate. For example, the thiol-containing compound may include 4-mercaptomethyl-3,6-dithia-1,8-octanedithiol (MDTODT) and/or the isocyanate may include m-xylylene diisocyanate (XDI). In some embodiments, the monomer mixture may include a second thiol-containing compound, such as, for example, 1,3-benzene dithiol (1,3-BDT).

20 Claims, 12 Drawing Sheets
(1 of 12 Drawing Sheet(s) Filed in Color)

(51) Int. Cl.
    *C08G 75/14*     (2006.01)
    *C08G 77/442*     (2006.01)
    *C08K 5/00*     (2006.01)
    *C08K 5/57*     (2006.01)
    *G02B 1/04*     (2006.01)
    *G02B 27/01*     (2006.01)

(52) U.S. Cl.
    CPC .......... *C08G 77/442* (2013.01); *C08K 5/0025* (2013.01); *C08K 5/57* (2013.01); *G02B 1/04* (2013.01); *G02B 6/0018* (2013.01); *G02B 27/0172* (2013.01)

(58) Field of Classification Search
    CPC .... C08G 75/14; C08G 77/442; C08K 5/0025; B29D 11/00355; B29D 11/0073
    See application file for complete search history.

(56) References Cited

FOREIGN PATENT DOCUMENTS

| WO | 2013103277 A1 | 7/2013 |
|---|---|---|
| WO | 2020263866 A1 | 12/2020 |

OTHER PUBLICATIONS

International Search Report and Written Opinion for International Application No. PCT/US2022/047682, mailed Feb. 8, 2023, 11 pages.

\* cited by examiner

SYSTEMS AND METHODS OF MAKING POLYMERIC OPTICAL LAYERS FOR OPTICAL LAYERING

RELATED APPLICATION

This patent application claims priority to U.S. Provisional Patent Application Ser. No. 63/271,533, filed Oct. 25, 2021, entitled "HIGH REFRACTIVE INDEX, LOW OPTICAL LOSS POLYMERS FOR OPTICAL LAYERING APPLICATIONS," which is assigned to the assignee hereof and is incorporated herein by reference in its entirety for all purposes.

BACKGROUND

A waveguide is a structure that guides waves, such as acoustic or optic waves. In the context of head-mounted displays (HMDs), waveguides direct light waves to a user's eye. Adding optical layers to a waveguide can improve the optical efficiency and characteristic of a waveguide. The addition of one or more optical layers to a waveguide, however, presents numerous challenges. For example, adding additional optical layers to a waveguide can increase the density, weight, and total thickness variation (TTV) of the waveguide. Additionally, application of an optical layer to a waveguide presents manufacturing challenges. For example, application of currently available optical layers or films results in adherence issues and/or delamination of one or more of the optical layers from the waveguide or an adjacent optical layer during processing. Presently, waveguides do not include optical layers due to manufacturing difficulties and resulting optical issues of the waveguide with the optical layer. Accordingly, there is a need for an improved systems and methods for producing optical layers for optical layering applications.

SUMMARY

The present disclosure relates to systems and methods of making polymeric optical layers for optical layering applications. In an aspect, a waveguide device for a head mounted display is provided. The waveguide device may include a waveguide die having a first refractive index range and a polymeric optical layer. The polymeric optical layer may include a second refractive index range that is different from the first refractive index range and a thiol-containing polymer. For example, the thiol-containing polymer may include thiourethane. In some embodiments, the thiol-containing polymer may be formed from a monomer mixture including a thiol-containing compound and an isocyanate. For example, the thiol-containing compound may include 4-mercaptomethyl-3,6-dithia-1,8-octanedithiol (MDTODT) and/or the isocyanate may include m-xylylene diisocyanate (XDI). In some embodiments, the monomer mixture may include a second thiol-containing compound, such as, for example, 1,3-benzene dithiol (1,3-BDT).

In some embodiments, the polymeric optical layer may include a varying index optical layer having a refractive index gradient across a thickness of the polymeric optical layer. In other embodiments, the polymeric optical layer may include a plurality of polymeric optical layers, where each of the plurality of polymeric optical layers is a discretized layer having a different refractive index than an adjacent polymeric optical layer.

In another aspect, a method for forming a waveguide device is provided. The method may include segmenting a wafer to obtain a waveguide die. For example, the method may include diving the wafer to obtain the waveguide die. The method may also include dispensing a monomer mixture onto the waveguide die. The monomer mixture may include a thiol-containing compound and an isocyanate. For example, the thiol-containing compound may include MDTODT and/or the isocyanate may include XDI. In some embodiments, the monomer mixture may include a catalyst such as, for example, dibutyltin dichloride (DBTDC).

The method may also include curing monomer mixture to form a polymeric optical layer on the waveguide. In some embodiments, the method may further include adding a second thiol-containing compound to the monomer mixture prior to dispensing the monomer mixture onto the waveguide die. In other embodiments, the method may include applying a planarization stamp to the dispensed monomer mixture before curing to set a thickness of the polymeric optical layer. The method may further include installing the waveguide device in a head-mounted display.

In another aspect, a polymeric optical layer for optical applications is provided. The polymeric optical layer may include a thiol-containing polymer. The thiol-containing polymer may be formed from a monomer mixture include a thiol-containing compound. The thiol-containing compound may include at least one of 4-mercaptomethyl-3,6-dithia-1, 8-octanedithiol (MDTODT), bis(2-mercaptoethyl)sulfide (BMES), or 1,3-benzene dithiol (1,3-BDT). The monomer mixture may also include an isocyanate. The isocyanate may include at least one of m-xylylene diisocyanate (XDI) or tetravinyl silane (TVSi).

The polymeric optical layer may have a thickness from 200 to 500 μm, a refractive index from 1.4-1.7 across the thickness of the polymeric optical layer, and an absorption, α, that is less than or equal to 0.02 cm$^{-1}$. In some embodiments, the polymeric optical layer may further have a density, ρ, in a range from 0.1 to 2 g/cm$^3$ and a bidirectional scattering distribution function (BSDF) that is less than or equal to 0.001 sr$^{-1}$.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and constitute a part of this specification, illustrate one or more certain examples and, together with the description of the example, serve to explain the principles and implementations of the certain examples.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Optical layers are known to improve optical performance properties of systems. Optical layers, however, that meet the desired optical performance properties of optical applications, such as waveguide devices, face manufacturing challenges. For example, lamination of materials, such as commercial tapes and film adhesives, do not meet optical requirements. Even upon adhesion, current optical layers often become damaged or defective during processing. For example, delamination of the optical layer from the optical device or damage to the optical layer due to heat from processing are common.

The optical layers provided herein can boost eyebox efficiency by two to five times, depending on the polymer's refractive index, layer thickness, and intrinsic absorption and scatter of the material. Importantly, these optical layers can provide these improvements to optical applications without sacrificing weight or manufacturability. For example, an optical layer may have adhesion capabilities with the optical device and experience minimal delamination or defects during various processing steps. The optical layer may also be capable of withstanding various curing methods, such as rapid curing methods required for production of consumer electronics. Moreover, the optical layer may allow for conventional processing methods to remain unchanged to reduce production cost, and thereby cost of consumer electronics.

Figure 1A:
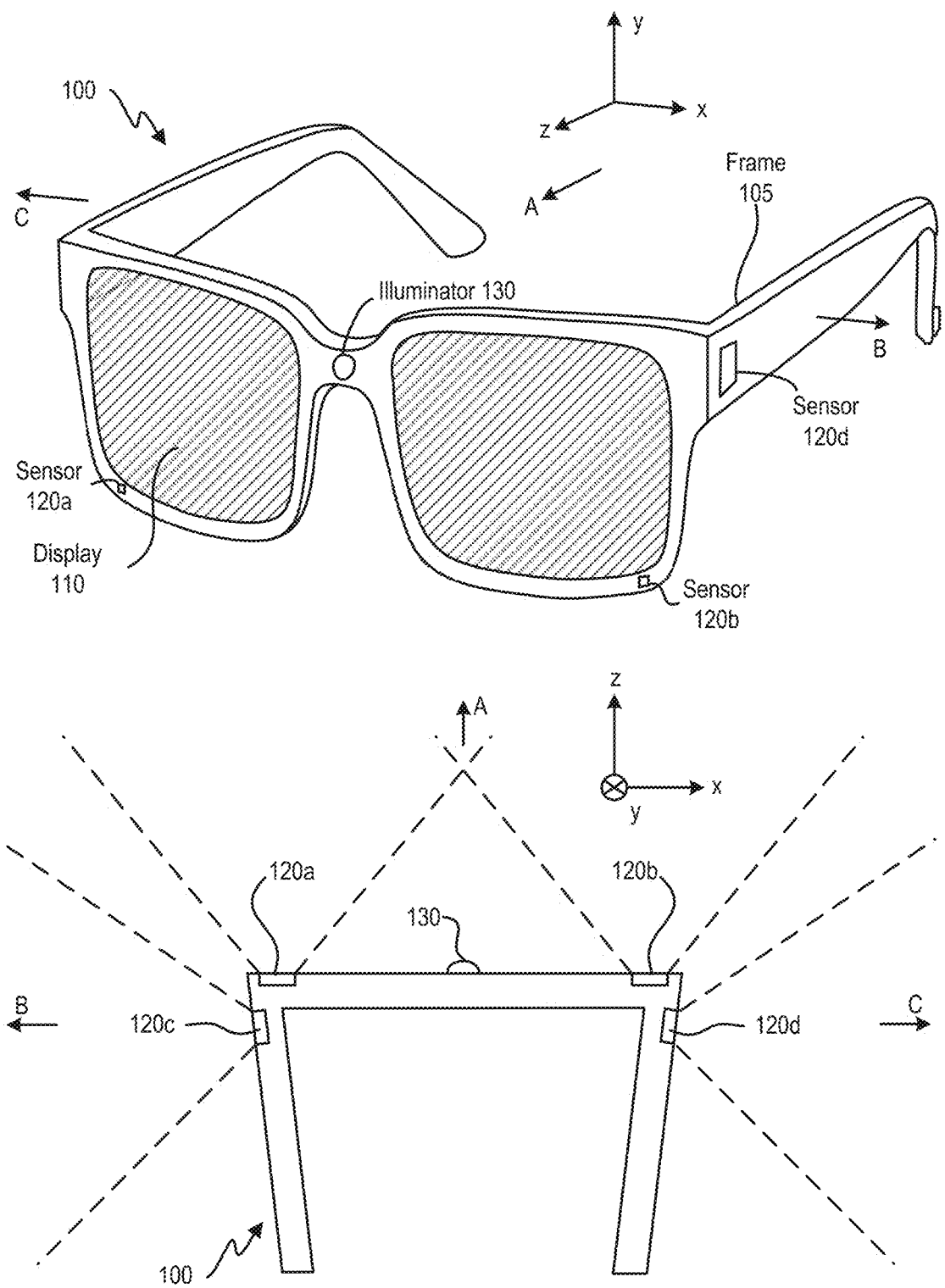
FIGS. 1A and 1B are diagrams of an embodiment of a near-eye display.

Turning now to FIG. 1A, a diagram of an embodiment of a near-eye display 100 is provided. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images with an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of views towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such arrangement, the accuracy and robustness of tracking a location of the user within the physical environment can be improved.

In some embodiments, near-eye display 100 may further include one or more active illuminator 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
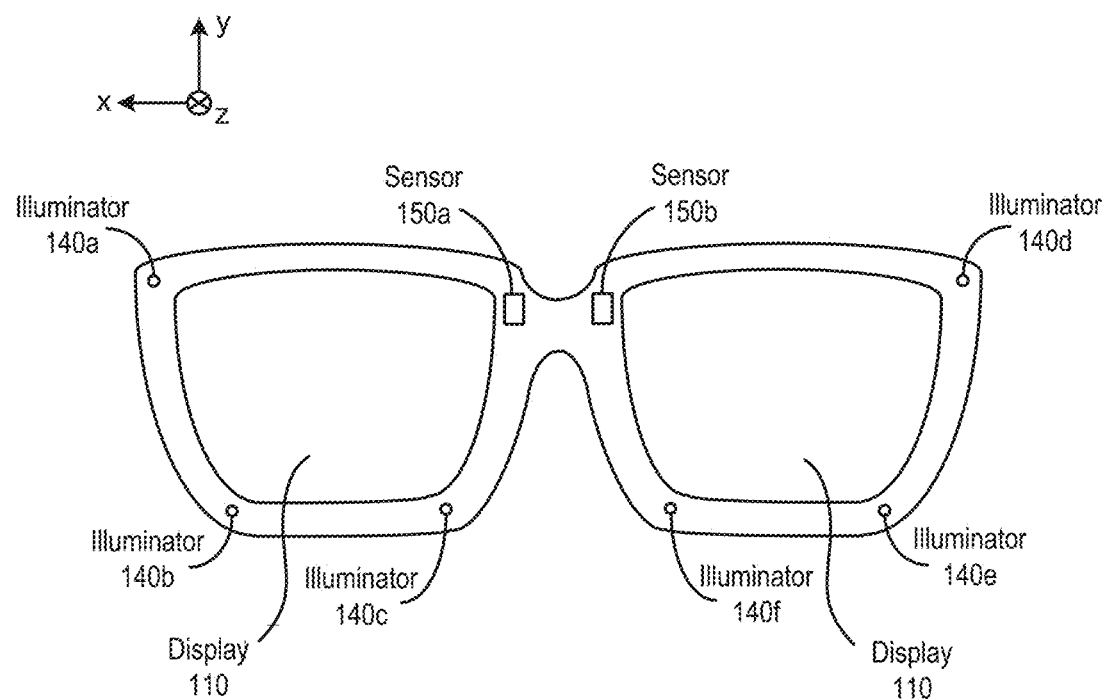

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
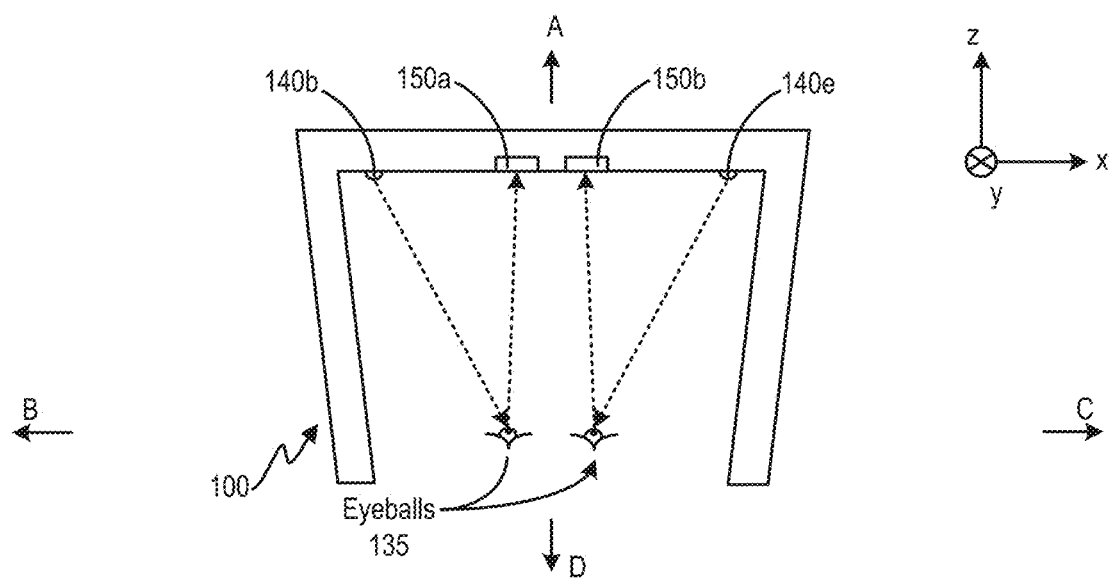
Figure 2:
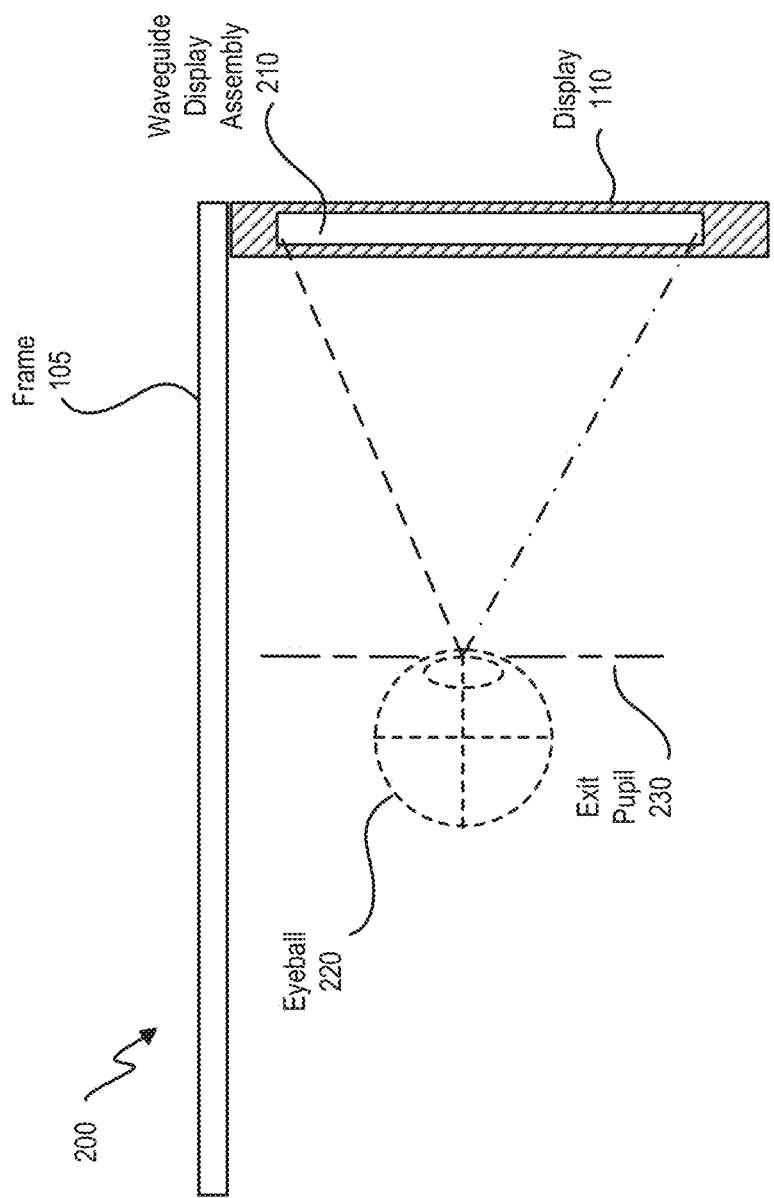
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
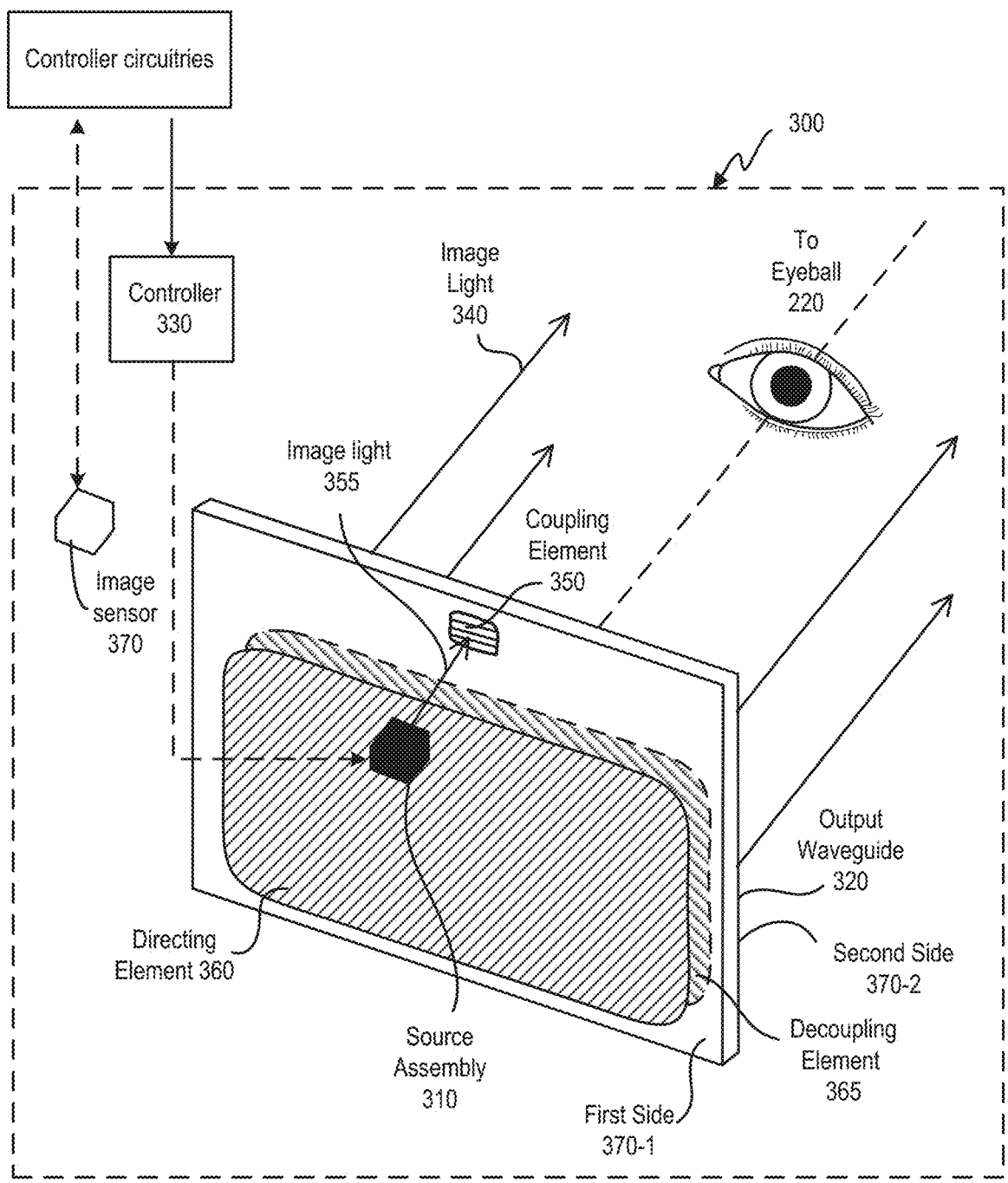
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide displays separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of, e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
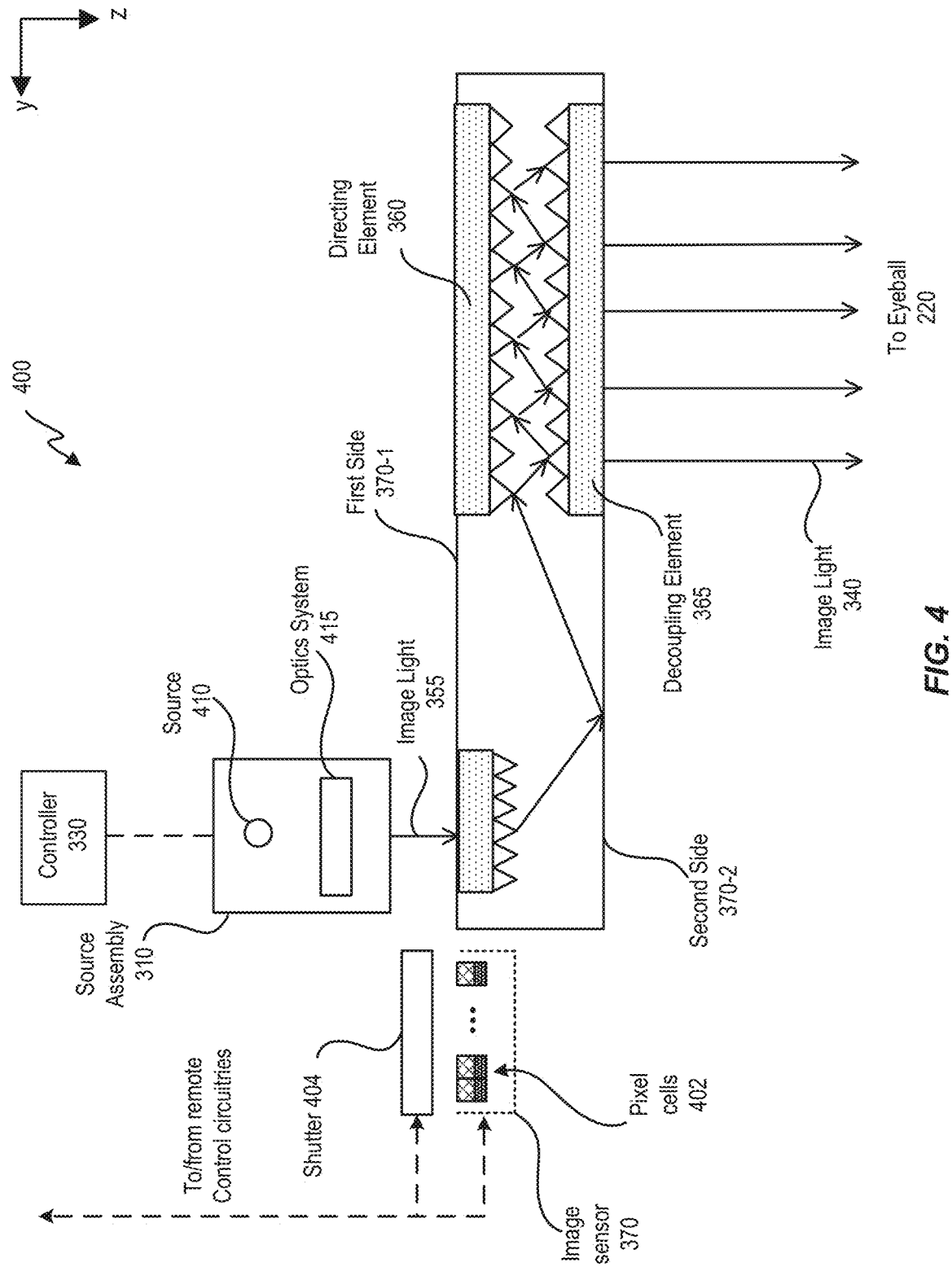
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generates image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
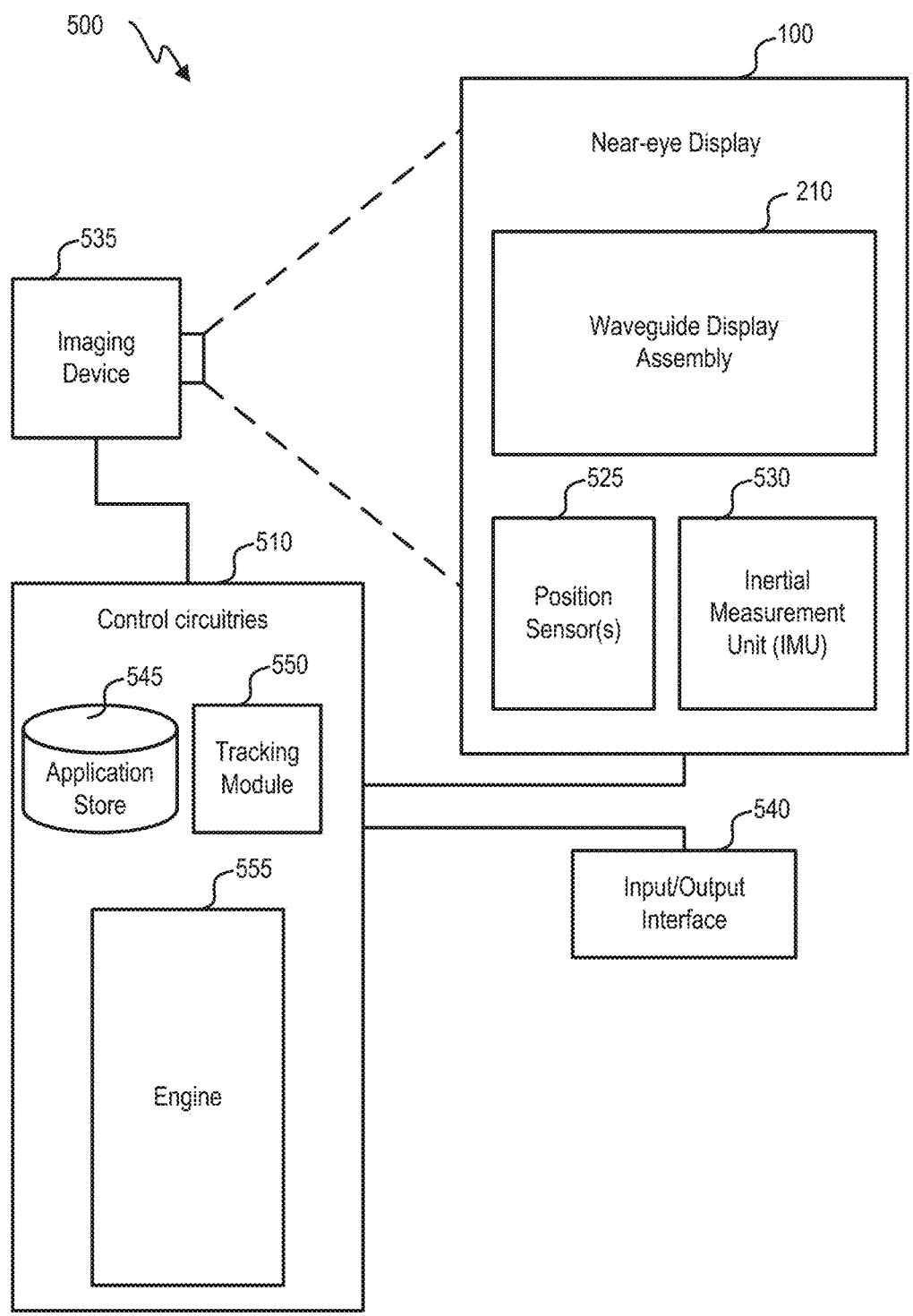
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provides media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback application, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), a distance between an object and user (e.g., based on image data provided by imaging device 535).

Figure 6A:
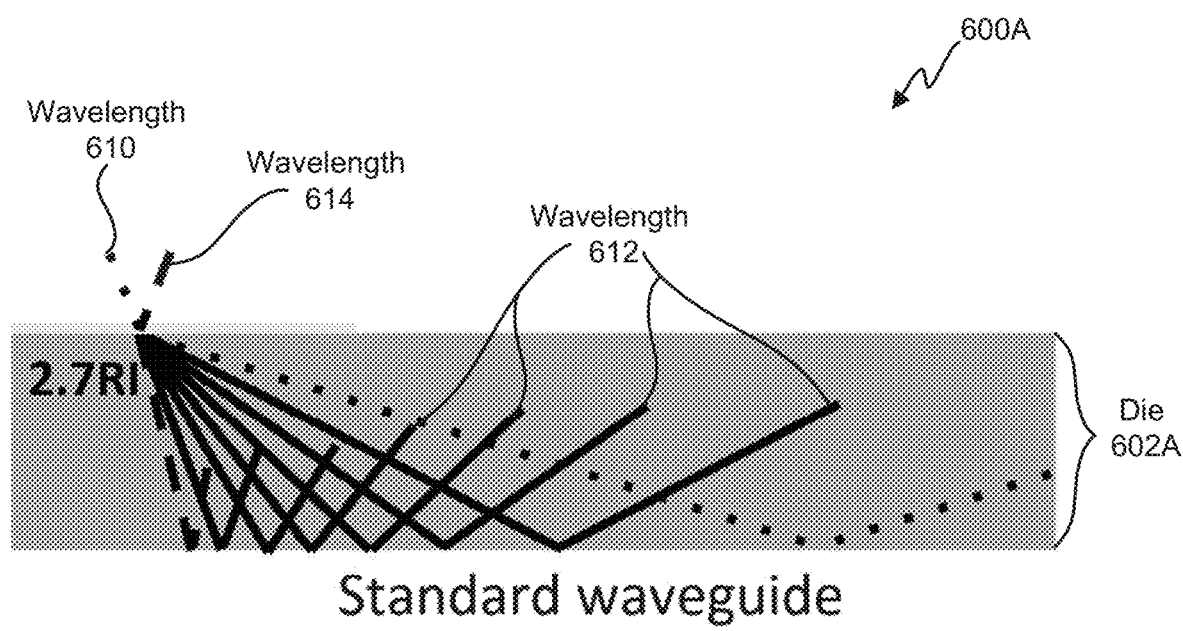
FIG. 6A illustrates a waveguide device, according to an embodiment herein.
Figure 6B:
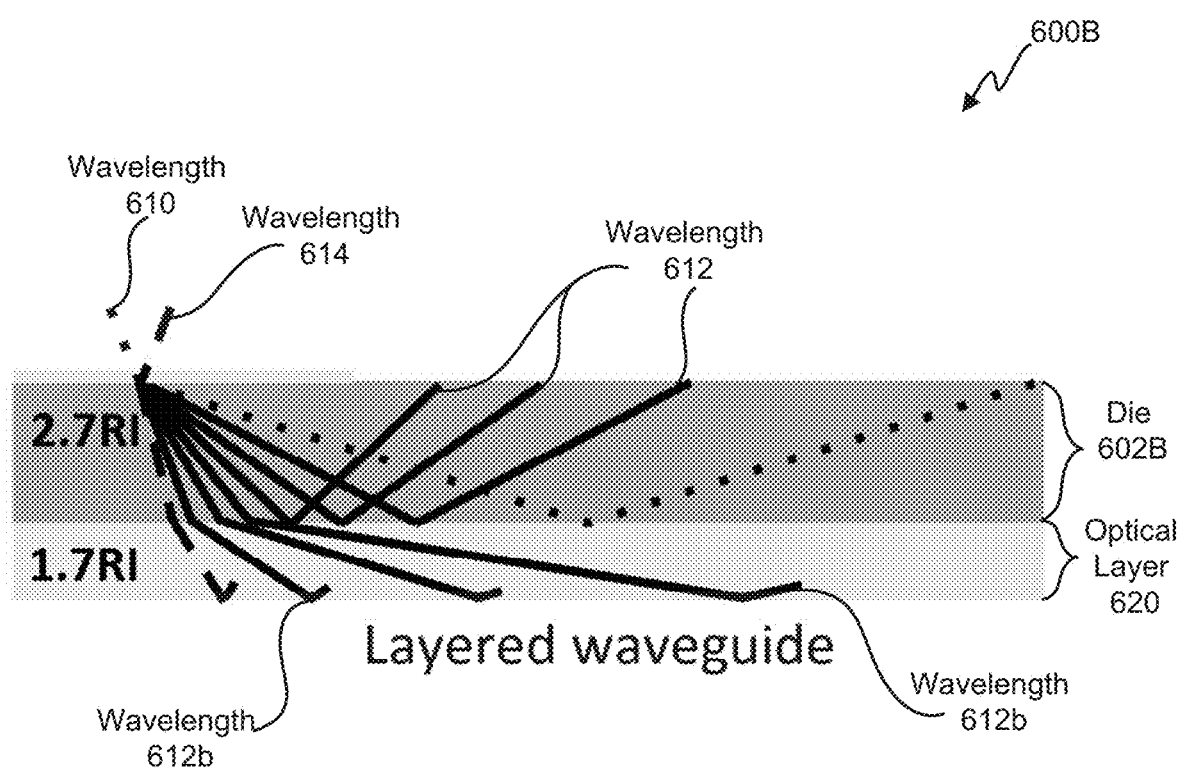
FIG. 6B illustrates a layered waveguide device, according to an embodiment herein.

Waveguides, such as those included in output waveguide 320 and waveguide display assembly 210 may include one or more optical layers. Adding an optical layer to a waveguide can improve the optical efficiency and characteristics of the waveguide and resulting waveguide device (e.g., waveguide display assembly 210). Turning now to FIGS. 6A and 6B, a waveguide device 600A and FIG. 6B a layered waveguide device 600B are provided to illustrate an example benefit of adding an optical layer to a waveguide device.

FIG. 6A depicts waveguide device 600A. Waveguide device 600A does not include any additional optical layers. Instead, waveguide device 600A includes a waveguide die 602A. Waveguide die 602A provides the optical properties of waveguide 600A. For example, as illustrated, waveguide die 602A has a refractive index (RI) of 2.7. A refractive index of a material influences how light received by the material is refracted back towards the light source. Additionally, the refractive index can split light into constituent colors. For example, as illustrated, wavelength 610, upon entering waveguide die 602A, is split into a plurality of wavelengths 612. An example of this is white light being split into its constituent colors.

A disadvantage of waveguide device 600A is that certain wavelengths can be lost or distorted due to the optical properties of waveguide die 602A. Components or materials used to manufacture waveguide device 600A can cause for decoupling of segments of light or loss of certain regions of wavelengths, such as wavelength 614. As illustrated, wavelength 614 is lost (e.g., not refracted back out of waveguide die 602A) due to the optical properties of waveguide die 602A. An example of wavelength decoupling is silicon carbide. Silicon carbide is a common component of waveguide devices, for example waveguide dies can be formed from silicon carbide. Silicon carbide, however, is known to decouple segments of light wavelengths. By adding an optical layer to a waveguide device, such as waveguide device 600A, lost wavelengths may be recoupled and utilized by the waveguide device.

Layered waveguide device 600B, shown in FIG. 6B, includes an optical layer 620. Optical layer 620 may be applied to waveguide die 602B of the layered waveguide device 600B. Waveguide die 602B may be the same or have substantially the same optical properties as waveguide die 602A. Optical layer 620 may have different optical properties than waveguide die 602B. For example, as illustrated, optical layer 620 may have a refractive index of 1.7. Due to the optical properties of optical layer 620, wavelength 614 may be recaptured and refracted out of waveguide die 602B. This is in contrast to waveguide device 600A in which wavelength 614 was lost (e.g., decoupled).

Optical layer 620 may also decouple various wavelengths that would be refracted back by waveguide device 600A. As shown, a portion of wavelengths 612 is refracted (wavelengths 612a) but a portion of wavelengths 612 is decoupled (wavelengths 612b). In this manner, optical layer 620 can be used to fine tune the optical properties of layered waveguide device 600B. In other words, optical layers which couple and/or decouple particular segments of wavelengths can be utilized to achieve a waveguide having desired optical properties.

The optical layers provided herein, such as optical layer 620, may be polymeric optical layers. A polymeric optical layer, as provided herein, can have desirable optical properties without impacting the manufacturability of the waveguide device. For example, while glass substrates can be used as an optical layer, glass substrates have a higher density (e.g., $\rho=3.20$ g/cm$^3$), which can negatively impact the manufacturability of a waveguide device. In contrast, the polymeric optical layers provided herein may have a density, p, less than 2 g/cm$^3$. In embodiments, the polymeric optical layers may have a density, p, in a range from 0.1 to 2 g/cm$^3$, from 0.5 to 1.7 g/cm$^3$, from 0.7 to 1.5 g/cm$^3$, or from 0.8 to 1.2 g/cm$^3$.

The polymeric optical layers provided herein may have desirable optical properties. For example, the polymeric optical layers may have negligible optical loss, low scatter, and low surface roughness. The polymeric optical layers may have negligible optical loss, meaning that they have low visible light absorption. In some embodiments, the polymeric optical layers provided herein may have a low absorption, $\alpha$, that is less than or equal to 0.02 cm$^{-1}$. For example, a polymer optical layer may have an absorption, $\alpha$, that is in a range from 0.001 to 0.02 cm$^{-1}$, from 0.005 to 0.015 cm$^{-1}$, or from 0.007 to 0.01 cm$^{-1}$.

The polymeric optical layers may have a low scatter as well. In some embodiments, a polymeric optical layer may have a bidirectional scattering distribution function (BSDF) that is less than or equal to 0.001 sr$^{-1}$. For example, the polymer optical layer may have an BSDF that is in a range from 0.000001 to 0.01 sr$^{-1}$, from 0.00001 to 0.001 cm$^{-1}$, or from 0.0001 to 0.01 cm$^{-1}$.

The polymeric optical layers may also have low surface roughness. Low surface roughness may be desirable because it contributes to loss due to surface scatter. In an embodiment, a polymeric optical layer may have a surface roughness, sq, that is less than or equal to 1 nm. For example, the polymeric optical layer may have a surface roughness, sq, that is in a range from 0.1 to 1 nm, from 0.2 to 0.8 nm, or from 0.5 to 0.7 nm. The optical layer may also have surface roughness controllability during the curing process.

Components of a Monomer Mixture

The optical layers may be formed from a monomer mixture. According to an embodiment, the polymeric optical layer may be a thiol-containing polymer. In such an embodiment, the monomer mixture may include a thiol-containing compound. A thiol-containing compound may be a compound having a thiol or a thiol derivative in its chemical structure. For example, a thiol-containing compound may include any compound having an organosulfur branch of the form R—SH, where R represents an alkyl or other organic substitute. Example thiol-containing compounds may include a formulation involving a subset of one or more sulfur-rich aliphatic thiols, aromatic thiols, and/or thiol-reactive compounds.

In some embodiments, the thiol-containing compounds may be or include bis(2-mercaptoethyl)sulfide (BMES). The chemical structure of BMES may be as follows:

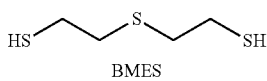

BMES

In some embodiments, the thiol-containing compounds may be or include 1,3-benzene trithiol, (1,3-BTT). The chemical structure of 1,3-BDT may be as follows:

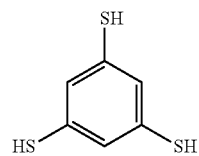

In some embodiments, the thiol-containing compound may be or include 1,3-benzene dithiol (1,3-BDT). The chemical structure of 1,3-BDT may be as follows:

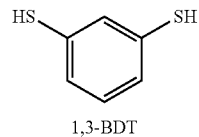

1,3-BDT

In some embodiments, the thiol-containing compound may be or include 4-Mercaptomethyl-3,6-Dithia-1,8-Octanedithiol (MDTODT). The chemical structure of MDTODT ma be as follows:

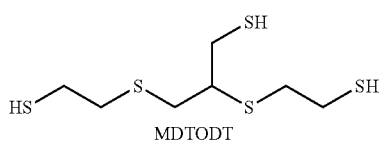

MDTODT

To form the monomer mixture, the thiol-containing compound may be combined with one or more isocyanates or isocyanate derivatives. Isocyanates are low molecular weight chemicals with high reactivity that can be used to form polymers. Example isocyanates may include m-xylylene diisocyanate (XDI), tetravinyl silane (TVSi), and 4,4'-methylenediphenyl diisocyanate (MDI), which may have the following chemical structures:

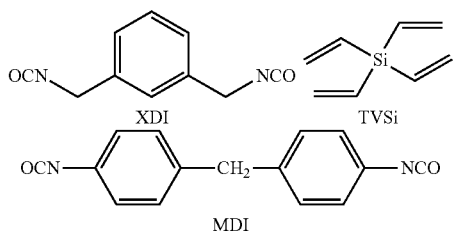

In other embodiments, the isocyanates may include 1,3-phenylene diisocyanate, 1,4-phenylene diisocyanate, Methylene di-p-phenyl diisocyanate, 2-Methyl-m-phenylene diisocyanate, 4-Chloro-6-methyl-1,3-phenylene diisocyanate, Tolylene-2,4-diisocyanate, Tolylene-2,6-diisocyanate, 1,5-Naphthalene diisocyanate, and/or other compounds with isocyanate groups with functionality of two or more. Isocyanates possessing high refractive index rigid moieties such as aromatic groups, sulfur atoms or heavy halogen atoms may be desirable because it provides increased final modulus, glass transition temperature, and refractive index via preferential packing interactions (such as π-π stacking for benzene rings). High purity monomers may also produce low optical loss materials.

The isocyanate is mixed with the thiol-containing compound to form the monomer mixture. The amount of thiol-containing compound add to an isocyanate may be based on a ratio of thiol groups to isocyanate groups. For example, the thiol-containing compound may be added to the isocyanate at a ratio of 1:1 thiol groups to isocyanate groups, 1:2 thiol groups to isocyanate groups, 1:3 thiol groups to isocyanate groups, 1:4 thiol groups to isocyanate groups; or 1:5 thiol groups to isocyanate groups.

Once the monomer mixture is formed, the monomer mixture is cured to form a thiol-containing polymer. Example thiol-containing polymers may include thiourethane polymers, such as poly(thiourethane), poly(dithiourethane), polysulfide, and the like. The polymeric optical layer may be formed from the thiol-containing polymer.

As isocyanates are highly reactive, not all thiol-containing compounds can withstand the reactivity of a isocyanate. Table 1 provides the results of experiments in which four different thiol-containing compounds were mixed with an isocyanate. Each of the thiol-containing compounds were combined with the isocyanate, XDI. Although the following discussion involves XDI as the isocyanate, other types of isocyanates may be used. For example, MDI may be used as the isocyanate and similar results as those provided in Table 1 are anticipated.

Table 1 is provided to illustrate the reactivity responses of different thiol-containing compounds with an isocyanate. Each of the thiol-containing compounds were mixed with XDI at a 1:1 molar ratio at atmospheric conditions (e.g., STP conditions). Upon mixing, each of the combinations were observed. In particular, the reactivity of the combinations were monitored for viscosity changes and temperature changes. For each of the combinations, the exothermic nature of the combination and the resulting viscosity of the combination were evaluated. The results are as follows:

In experiment 1, the thiol-containing compound, BMES was mixed with XDI. Upon mixing, the combination of BMES and XDI rapidly gelled (e.g., became highly viscous) and underwent a highly exothermic reaction.

In experiment 2, the thiol-containing compound, MDTODT was mixed with XDI. Upon mixing, a homogenous, low viscosity mixture was formed.

In experiment 3, the thiol-containing compound, 1,3-benzene dithiol (1,3-BDT), was mixed with XDI. Upon mixing, the combination of BMES and XDI rapidly gelled (e.g., became highly viscous) and underwent a highly exothermic reaction.

In experiment 4, the thiol-containing compound, 1,3-BTT, was mixed with XDI. Upon mixing, the combination of BMES and XDI rapidly gelled (e.g., became highly viscous) and underwent a highly exothermic reaction.

TABLE 1

| Experiment Number | Thiol Type | Isocyanate Type | Observation |
| --- | --- | --- | --- |
| 1 | BMES | XDI | Highly exothermic, gels rapidly upon addition |
| 2 | MDTODT | XDI | Homogeneous low viscosity mixture with tunable curing kinetics |
| 3 | 1,3-BDT | XDI | Highly exothermic, gels rapidly upon addition |
| 4 | 1,3-BTT | XDI | Highly exothermic, gels rapidly upon addition |

As noted above, experiment 2 involving MDTODT and XDI provided a homogenous monomer mixture with a low viscosity. The resulting monomer mixture also allowed for tunable curing kinetics. Having a monomer mixture that allows for tunable curing kinetics may be advantageous because it allows for a range of manufacturing approaches for the optical layer. Experiment 2 produced a usable, improved monomer mixture.

Various types of isocyanates may be used to form the monomer mixture. As illustrated by the examples above, in some embodiments the isocyanate may be or include XDI. In other embodiments, the isocyanate may be or include tetravinyl silane (TVSi). Table 2 provides observations from four experiments in which various thiol-continuing compounds are combined with TVSi to form a monomer mixture. Each of the thiol-containing compounds were mixed with TVSi at a 1:1 molar ratio at atmospheric conditions (e.g., STP conditions).

As shown in Table 2, the combination in experiments 1, 2, and 4 resulted in undesirable mixing, exothermic reactions, and even failed to form a monomer mixture. The results are as follows:

In experiment 1, the thiol-containing compound, BMES, was mixed with TVSi and a highly exothermic reaction was generated. Upon mixing, the monomer mixture rapidly gelled and formed a high viscosity mixture.

In experiment 2, the thiol-containing compound, MDTODT, was mixed with TVSi and the resulting mixture underwent phase separate. Hence, the resulting mixture failed to form a homogenous mixture. Additionally, the mixture partially gelled upon mixing, failing to form a low viscosity mixture.

In experiment 3, the thiol-containing compound, 1,3-BDT, was mixed with TVSi and formed a homogenous, low viscosity monomer mixture. The monomer mixture ended up reacting after 1-2 days to form some precipitants. Experiment 3 produced a more useable monomer mixture than experiments 1-2, and 4.

In experiment 4, the thiol-containing compound, 1,3,5-BTT, was mixed with TVSi, and the resulting monomer mixture was an immiscible mixture.

TABLE 2

| # | Thiol type | Isocyanate | Observation |
|---|---|---|---|
| 1 | BMES | TVSi | Highly exothermic, gels rapidly upon addition |
| 2 | MDTODT | TVSi | Phase separates after mixing, and partially gels |
| 3 | 1,3-BDT | TVSi | Reacts after 1-2 days with some precipitation |
| 4 | 1,3,5-BTT | TVSi | Immiscible |

In some embodiments, one or more additives may be added to form the monomer mixture. Depending on the specific preparation methods required for mixing and curing, additives may include a base, a catalyst, a stabilizer, UB absorber, surfactant, and/or a mold release agent.

In some embodiments, a base or a catalyst, such as dibutyltin dichloride (DBTDC) may be added to the monomer mixture to accelerate or catalyze the curing of the monomer mixture to form the optical layer. The base may be added on a molar basis to the combination of the one or more thiol-containing compounds and isocyanate. The base may be added at a concentration from 1-1000 parts per million (ppm). For example, the base may be added at a concentration from 50-750 ppm, from 100-600 ppm, 200-500 ppm, or from 200-300 ppm.

Most bases, however, can lead to uncontrolled and/or highly localized exothermic reactions upon addition. As such, experiments were produced to identify a base for production of an optical layer. Table 3 provides the results of four experiments that were performed to identify a base for production of the optical layer provided herein. Four different types of bases where added to a mixture containing MDTODT and XDI at a concentration of 100-200 ppm.

The base used to perform experiment 1 of Table 3 included triethylamine (TEA), which can have a chemical structure as follows:

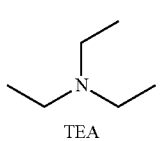
TEA

The base used to perform experiment 2 of Table 3 included 1,8-Diazabicyclo[5.4.0]undec-7-ene (DBU), which can have a chemical structure as follows:

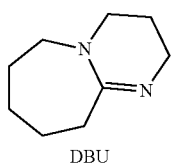
DBU

The base used to perform experiment 3 of Table 3 included 1,8-1,5-Diazabicyclo[4.3.0]non-5-ene (DBN), which can have a chemical structure as follows:

DBN

The base used to perform experiment 4 of Table 3 included dibutyltin dichloride (DBTDC), which can have a chemical structure as follows:

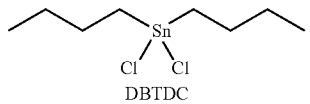
DBTDC

As shown by Table 3, the bases in experiments 1-3 all resulted in a highly exothermic reaction and rapid gelation upon addition of the base. That is, the bases TEA, DBU, and DBN generated undesirable exothermic reactions and resulted in a high viscosity monomer mixture when added to MDTODT and XDI.

As shown below, the base in experiment 4, DBTDC, did not generate an undesirable exothermic reaction. Instead, upon mixing with MDTODT and XDI, DBTDC as a base produced a homogenous, low viscous mixture. Advantageously, using DBTDC as a base for catalyzation of MDTODT and XDI allowed for a monomer mixture having a tunable pot life. A pot life is the time after which two or more components are mixed and the resulting mixture is useable. Experiment 4 produced a useable monomer mixture.

TABLE 3

| # | Thiol type | Isocyanate type | Base (100-200 ppm) | Observation |
|---|---|---|---|---|
| 1 | MDTODT | XDI | TEA | Highly exothermic, gels rapidly upon addition |
| 2 | MDTODT | XDI | DBU | Highly exothermic, gels rapidly upon addition |
| 3 | MDTODT | XDI | DBN | Highly exothermic, gels rapidly upon addition |
| 4 | MDTODT | XDI | DBTDC | Homogeneous low viscosity mixture, tunable pot life |

Additional bases or catalysts may also be used to form the monomer mixture. For example, Dibutyltin Dilaurate (DBTDL), Dibutyltin Diacetate (DBTDA), Dibutyltin Bis(trifluoromethanesulfonate), Dibutyltin Oxide (DBO), 7-Methyl-1,5,7-triazabicyclo[4.4.0]dec-5-ene (mTBD), 1,1,3,3-Tetramethylguanidine (TMG), 1,5,7-Triazabicyclo[4.4.0]dec-5-ene (TBD), 4-Dimethylaminopyridine (DMAP), 1,4-Diazabicyclo[2.2.2]octane (DABCO), and/or quinuclidine.

Figure 7:
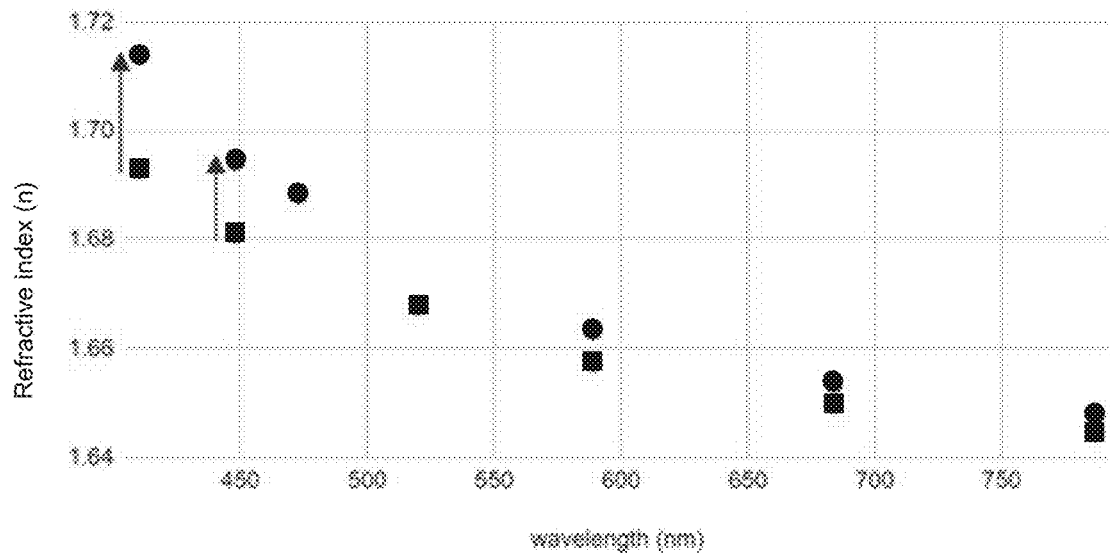
FIG. 7 depicts a graph depicting an increased refractive index achieved by the addition of a second thiol-containing compound, according to an embodiment herein.

In some embodiments, a second thiol-containing compound may be added. For example, a polymeric optical layer may be formed from two or more thiol-containing compounds and an isocyanate. FIG. 7 depicts a graph 700 depicting an increased refractive index achieved by the addition of a second thiol-containing compound. As shown in the graph, the refractive index of an optical layer can be increased across a range of wavelengths by the addition of a second thiol-containing compound.

To produce graph 700, a standard formulation was prepared. The standard formulation was produced by mixing a single thiol-containing compound, MDTODT, with an isocyanate, XDI, to produce a monomer mixture. The monomer mixture was then cured to form a polymeric optical layer. The polymeric optical layer produced from the standard formulation was then tested for refractive index across a range of wavelengths ranging from 400 to 800 nm. The results of the polymeric optical layer formed from the standard formulation are indicated by black boxes on graph 700.

A second formulation was prepared in which a second thiol-containing compound was added. To prepare the second formulation, 80 mol % of MDTODT was added to XDI to form an initial mixture and then 20 mol % of 1,3-BDT was added to the monomer mixture. The monomer mixture was then cured to form a polymeric optical layer. The polymeric optical layer produced from the second formulation was then tested for refractive index across the same wavelengths that the standard formation was tested across. The results of the polymeric optical layer formed from the second formulation are indicated by black circles on graph 700.

As shown, the addition of the second thiol-containing compound can increase the refractive index of the resulting polymeric optical layer. For example, the addition of the second thiol-containing compound can increase the refractive index by 0.2 between the wavelength ranges of 400-495 (e.g., in the blue wavelength range).

Another advantage of adding a second thiol-containing compound is accelerated curing of the monomer mixture to form the polymeric optical layer. For example, the second thiol-containing compound may have a higher reactivity which can initiate the polymerization process faster.

In embodiments involving two or more thiol-containing compounds, the order or sequence of which the thiol-containing compounds are combined with the isocyanate may be important. For example, when combining XDI with MDTODT and a second thiol-containing compound, such as 1,3-BDT, the improvements to refractive index and curing timing may be exhibited when MDTODT is added to XDI before adding 1,3-BDT. When 1,3-BDT is adding to XDI before MDTODT, the improvements may not be exhibited. Accordingly, the sequence in which the first and second thiol-containing compounds are added to the isocyanate may influence the optical properties of the polymeric optical layer.

To illustrate the influence of the order of which the thiol-containing compounds are added, two experiments were performed. In a first experiment, a first thiol-containing compound, MDTODT, was added to an isocyanate, XDI, at a 80:100 mol % ratio of total thiol groups to isocyanate groups. Upon addition, the MDTODT and XDI were mixed. After mixing, the remaining 20 mol % of thiol groups was added via a second thiol-containing compound, 1,3-BDT.

In a second experiment, both thiol-containing compounds, MDTODT and 1,3-MDT, were added together first at a 80:20 mol % ratio of total thiol groups to form a thiol-containing mixture. The thiol-containing mixture was then mixed. After mixing, stoichiometric equivalence of the isocyanate, XDI, was added (e.g., total mol of thiol groups equals total mol of isocyanate groups). The same amount of chemicals were added in both experiment 1 and 2, however, the order of adding the thiol-containing compound showed different outcomes. The resulting optical layer in the first experiment produced film samples in a reasonable timeframe, having improved refractive index. The second experiment, however, did not result in a film sample because an exothermic/runaway reaction occurred upon addition of the thiol-containing mixture to the isocyanate.

Preparing the Monomer Mixture

The monomer mixture may be formed by mixing one or more thiol-containing compounds with a isocyanate. The molar ratio of thiol-containing compounds to the isocyanate may be 1:1. Depending on the desired optical properties of the resulting optical layer, the molar ratio of thiol-containing compounds to isocyanate may vary. For example, in some embodiments the molar ratio of thiol-containing compounds to isocyanate may range from 1:1 to 1:25, from 1:1 to 1:10, from 1:1 to 1:5, or from 1:1 to 1:2.

Depending on the composition of the monomer mixture, the mixing time may vary. In an example embodiment, the monomer mixture may be mixed until a homogenous solution forms. In some cases, a vacuum may be used to degas the monomer mixture prior to curing.

Varying Refractive Index Optical Layers

Figure 8A:
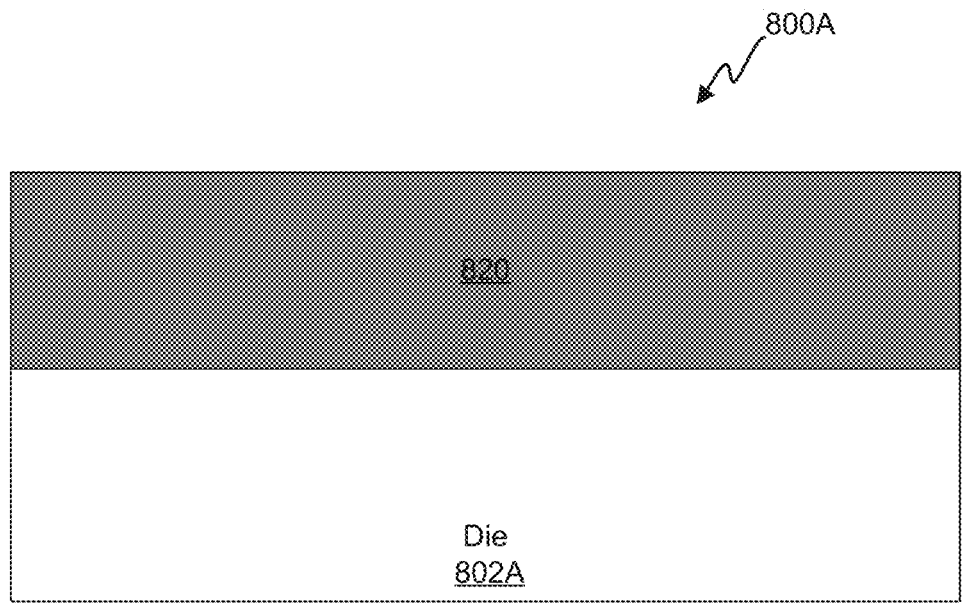
FIG. 8A illustrates a waveguide device having a single optical layer, according to an embodiment herein.
Figure 8B:
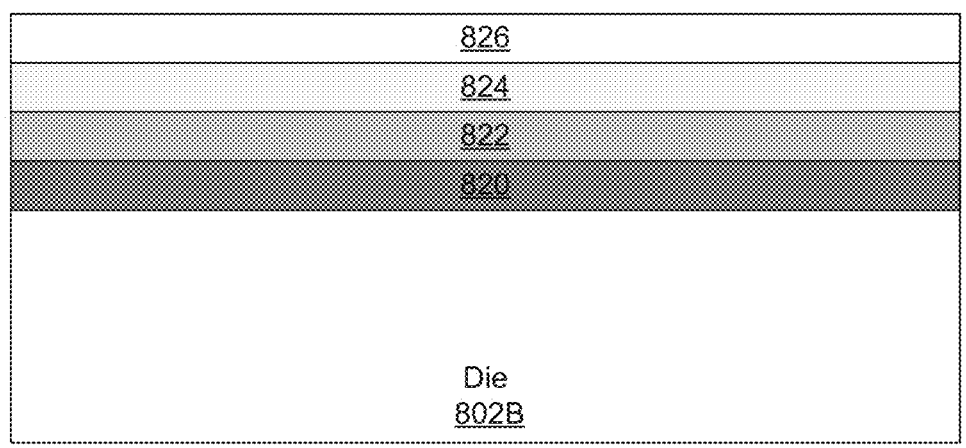
FIG. 8B illustrates a waveguide device having multiple optical layers, according to an embodiment herein.

Depending on the desired optical properties of a waveguide device, one or more optical layers may be added to the waveguide device. Turning now to FIGS. 8A and 8B, a waveguide device 800A having a single index optical layer is provided and a waveguide device 800B having multiple optical layers are provided. As illustrated by FIG. 8A, waveguide device 800A includes a waveguide die 802A. Waveguide die 802A may be the same as waveguide die 602A and 602B described above. Waveguide device 800A may be the same or similar to waveguide display assembly 210. A single optical layer 820 may be applied to waveguide device 800A. For example, optical layer 820 may be applied to waveguide die 802A of waveguide device 800A. Optical layer 820 may be a single index optical layer. A single index optical layer may be an optical layer that has a single refractive index throughout the bulk of the optical layer. The refractive index may be uniform across the depth or thickness of the optical layer. For example, optical layer 820 may have a refractive index ranging from 1.6-1.7 and regardless of where light enters optical layer 820, the light will be refracted according to that refractive index. Optical layer 820 may have different optical properties, such as refractive index, than waveguide die 802A.

In some embodiments, more than one optical layer is applied to a waveguide device. As illustrated in FIG. 8B, waveguide device 800B includes a waveguide die 802B and a plurality of optical layers 820, 822, 824, and 826. Waveguide device 800B may be the same or similar to waveguide display assembly 210. Waveguide die 802B may be the same or similar to waveguide die 802A and/or waveguide die 602B. Optical layer 820 may be applied to waveguide device 800B. For example, optical layer 820 may be applied to waveguide die 802B of waveguide device 800B. Optical layer 822 may be applied to optical layer 820, optical layer 824 may be applied to optical layer 822, and optical layer 826 may be applied to optical layer 824. As discussed in greater detail below, optical layers 820-826 may be applied to each other prior to application to waveguide device 800B or each of the optical layers 820-826 may be applied sequentially to waveguide device 800B.

Each of optical layers 820, 822, 824, and 826 may have different optical properties from the adjacent optical layer. For example, optical layer 820 may have a different refractive index than optical layer 822, optical layer 822 may have a different refractive index than optical layer 824, and optical layer 824 may have a different refractive index than optical layer 826. In an embodiment, each of the optical layers 820-826 may have a refractive index ranging from 1.0 to 2.0, from 1.2 to 1.5, or from 1.4 to 1.7. The refractive index of the optical layers 820-826 may vary over the thickness of each optical layer 820-826 or vary over the thickness of the stack of the optical layers 820-826. As discussed in greater detail below, the thickness of an optical layer within optical layers 820-826 may range from 50-750 µm, from 100-600 µm, or from 200-500 µm.

In some embodiments, optical layers 820-826 may be a single varying index optical layer. Instead of a plurality of distinct optical layers, such as optical layers 820-826, a single optical layer may be applied having a varying refractive index. That is, the refractive index may vary across the thickness of the varying index optical layer. In other words, the varying index optical layer may have a gradient refractive index, meaning that the refractive index may changes as light travels through the bulk of the optical layer. As light travels through the varying index optical layer, the light will encounter a different refractive index. For example, the varying index optical layer may have a refractive index ranging from 1.0 to 2.0, from 1.2 to 1.5, or from 1.4 to 1.7. The refractive index may increase as light penetrates the varying index optical layer. In other embodiments, the refractive index may decrease as light penetrates the varying index optical layer.

Figures 9A, 9B:
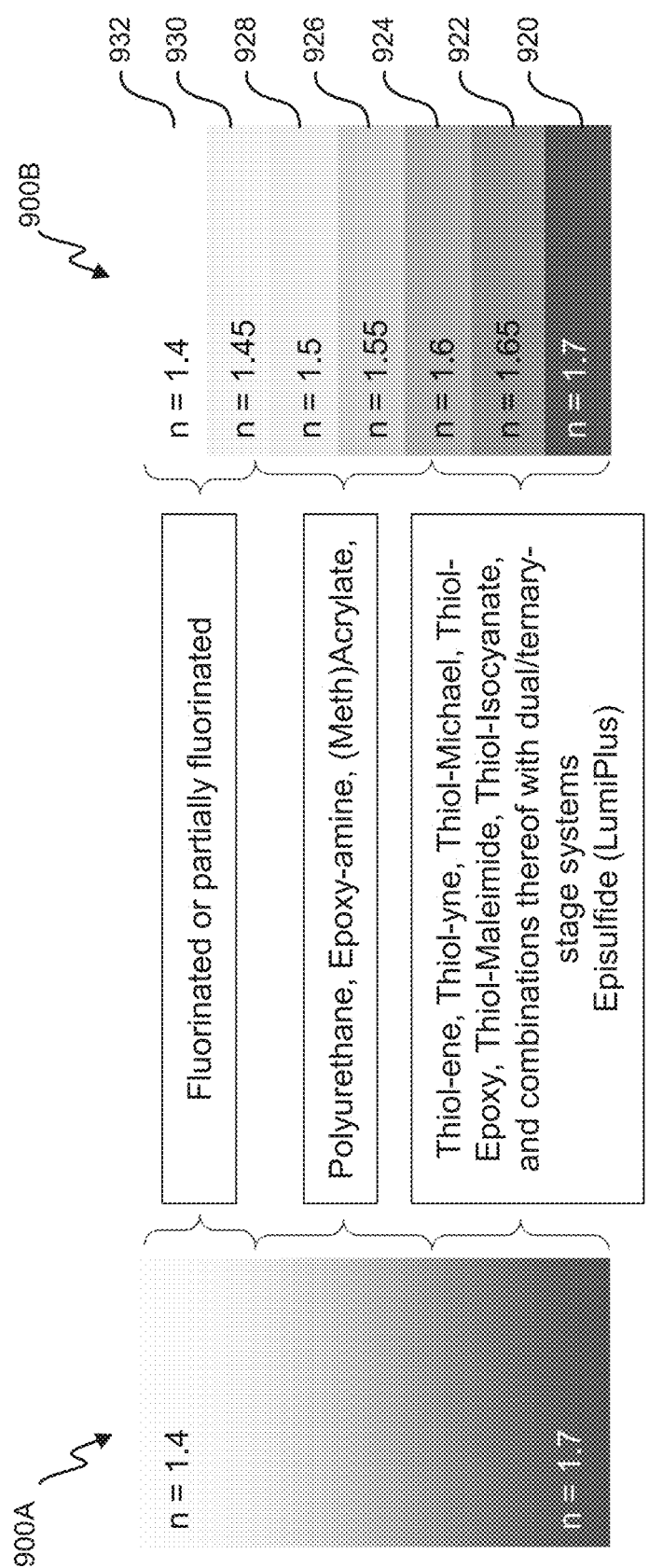
FIGS. 9A and 9B provide an illustrative example showing various components that can be used to form optical layers having desired refractive indices, according to an embodiment herein.

To achieve a different refractive indices, the optical layer may contain various components. Turning now to FIGS. 9A and 9B, an illustrative example is provided showing various components that can be used to form optical layers having desired refractive indices. FIG. 9A provides a varying index optical layer 900A having a refractive index gradient. FIG. 9B provides a stack of optical layers 900B having a plurality of optical layers 920, 922, 924, 926, 928, 930, and 932. As shown, the varying index optical layer 900A has a refractive index gradient that varies from 1.4 to 1.7 across the thickness of the varying thickness optical layer 900A. The varying index optical layer 900A may be formed as a single, continuous optical layer. The refractive index of the stack of optical layers 900B may also vary across the thickness of the stack of optical layers 900B, however, the stack of optical layers 900B is formed from discretized optical layers 920-932.

The variation of refractive index across both the optical layer 900A and the stack of optical layers 900B may be due to specific components that are added to achieve a desired refractive index. According to this illustrative example, to form the optical layers 920-924 or the section of the optical layer 900A having a refractive index of 1.6-1.7, the optical layer(s) may contain one or more thiol-containing compound. For example, the optical layers 920-924 or the section of the optical layer 900A may include one or more of a thiol-ene, a thiol-yne, a thiol-michael, a thiol-epoxy, a thiol-maleimide, a thiol-isocyanate, or a combination thereof with dual/ternary-stage systems, such as Episulfide from LumiPlus.

According to this illustrative example, to form the optical layers 924-930 or the section of the optical layer 900A having a refractive index of 1.45-1.6, the optical layer(s) may contain one or more of a polyurethane, epoxy-amine, (meth)acrylate, or any combination thereof. In some embodiments, the polyurethane, epoxy(amine), and/or (meth)acrylate may be added in addition to the thiol-containing compound of the optical layer. To form the optical layers 930-932 or the section of the optical layer 900A having a refractive index of 1.4-1.45 the thiol-containing compound may be fluorinated or partially fluorinated. Although fluorination is not exclusively required to reach this index range, it may be preferred to not have any thiols present in the optical layers 930-932 or the section of the optical layer 900A.

To form the optical layers 920-932, discretized layers of a monomer mixture may be deposited and then cured sequentially (e.g., layer by layer) to form each of the optical layers 920-932. In other embodiments, the optical layers 920-932 may be formed by diffusive dual-cure polymers. To form the varying index optical layer 900A, discretized layers of a monomer mixture may be deposited prior to curing or complete curing a previous layer. In this manner, a gradient of refractive indicates may be formed across a single optical layer, such as the varying index optical layer 920-932.

Methods of Making an Optical Layer

After a monomer mixture is formed, as provided above, the monomer mixture may be cured to form a polymeric optical layer. As noted above, manufacturing a waveguide having one or more optical layers can be challenging due to adherence and delamination issues. For example, in wafer-to-wafer (W2W) processing, a waveguide die is diced from a bonded stack containing the optical layer. Dicing of the waveguide die can lead to defects, such as delamination of the optical layer from the waveguide. The optical layers provided herein, however, allow for application of onto a waveguide without defecting during the manufacturing process.

Turning now to FIGS. 10A-10D, a method of forming an optical layer on a waveguide device is provided, according to an embodiment herein. At FIG. 10A, a monomer mixture 1010 can be applied onto a waveguide die 1002. The waveguide die 1002 may be used to form a waveguide device, such as the waveguide device assembly 210. The monomer mixture 1010 may be monomer mixture as provided above. For example, the monomer mixture may include one or two thiol-containing compounds added to an isocyanate.

The monomer mixture 1010 may be applied to the waveguide die 1002 by known means. For example, the monomer mixture 1010 may be dispensed or extruded onto the waveguide die 1002. In some embodiments, the monomer mixture 1010 may be coated or sprayed onto the waveguide die 1002, depending on the viscosity of the monomer mixture 1010. In still other embodiments, application of the monomer mixture 1010 may be performed by slot-waveguide die coating or inkjetting. Optionally, the monomer mixture 1010 may be dispensed with a cure and/or curing catalyst. For example, the catalyst may include DBTDC.

Figure 10A:
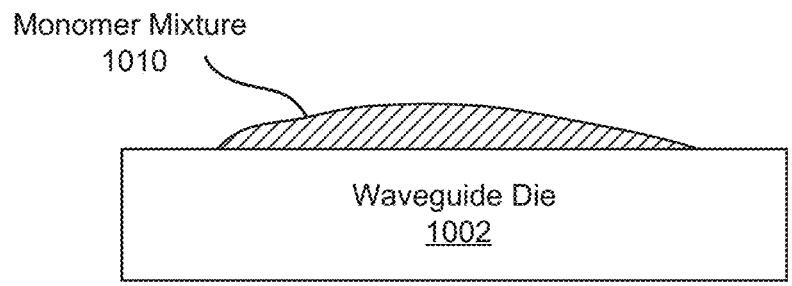
FIGS. 10A-10D illustrate a method of forming an optical layer on a waveguide device, according to an embodiment herein.
Figure 10B:
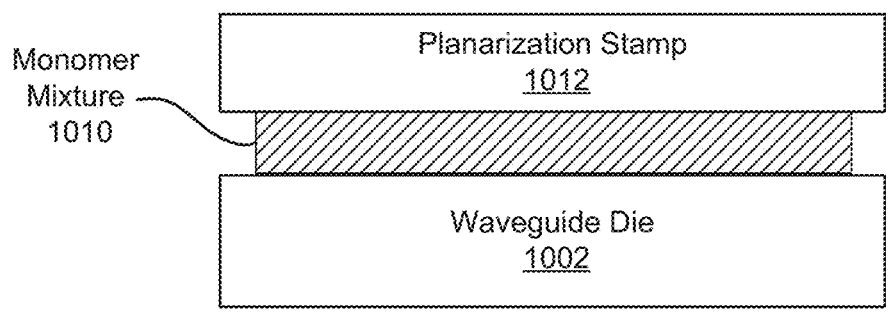

At FIG. 10B, a planarization stamp 1012 may be applied to the monomer mixture 1010.

In some embodiments, the planarization stamp 1012, along with the shims (not shown), may applied to the monomer mixture 1010 to set the thickness of the monomer mixture 1010 as it cures to form the optical layer. In example embodiments, the thickness of the optical layer may range from 10 to 1000 µm. For example, the thickness of the optical layer may range from 50 to 950 µm, from 100 to 750 µm, from 150 to 600 µm, or from 200 to 500 µm. In some embodiments, the thickness set by the planarization stamp 1012 may be slightly larger than the thickness of the final optical layer due to additional processing steps that are taken after curing of the monomer mixture 1010.

The resulting optical layer 1020 may have a total thickness variation (TTV) that is less than 25 µm. In preferred examples, the TTV may be less than 5 µm or less than 1 TTV as used herein means the difference between the maximum and minimum values of thickness of the optical layer 1020 between a series of point measurements. For example, the TTV of the optical layer 1020 may have a TTV that is in a range from 1-25 μm, from 5-20 μm, or from 1-15 μm.

Figure 10C:
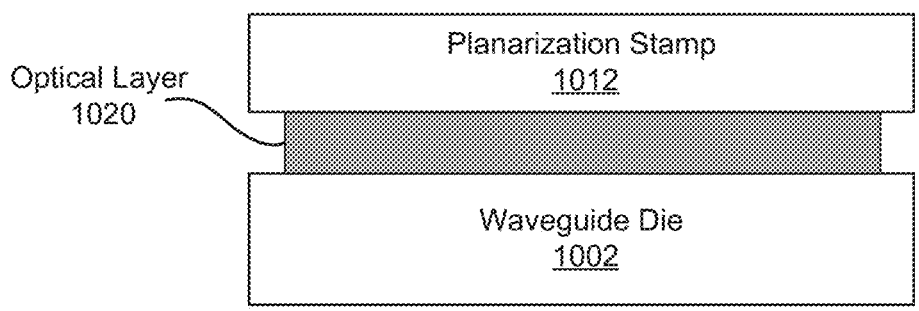

At FIG. 10C, the monomer mixture 1010 may be cured to form the optical layer 1020. To cure the monomer mixture 1010, the waveguide die 1002 having the monomer mixture 1010 thereto applied may be placed in an oven. The monomer mixture 1010 may be cured at a temperature ranging from 10° C. to 50° C. for a duration of 0.5 to 24 hours. In some embodiments, the monomer mixture 1010 may be cured at air temperature. Curing the monomer mixture 1010 may cause for polymerization of the monomer mixture 1010 to form the polymeric optical layer 1020.

As noted above, the monomer mixture 1010 may provide for improved curing characteristics over conventional mixtures for forming optical layers. For example, the monomer mixtures provided herein may cure faster than conventional mixtures for forming optical layers. Additionally, the monomer mixtures herein may also cure at lower temperatures than conventional mixtures for forming optical layers.

After curing, the optical layer 1020 may exhibit desirable properties. For example, optical layer 1020 may cure on-demand with planarity (e.g., TTV, bow, and wedge). In other words, due to the fast curing times, such as for example on-demand curing, the surface planarity of the optical layer 1020 can be set as desired without requiring further post-curing processing. As used herein, on-demand curing can mean curing the monomer mixture to form the optical layer at a curing temperature in less than five minutes, less than two minutes, less than one minute, or less than 30 seconds.

Figure 10D:
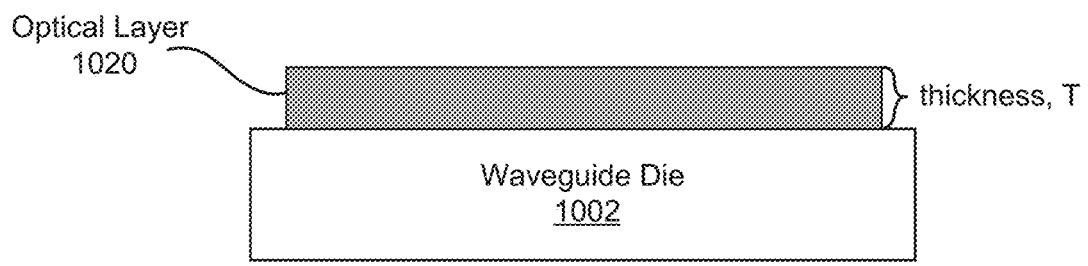

At FIG. 10D, after polymerization curing, the planarization stamp 1012 and shims may be removed. The polymeric optical layer 1020 may be cured onto the waveguide die 1002. The polymeric optical layer 1020 may have a thickness, T, that is determined by the planarization stamp 1012 and shims, as discussed above.

The waveguide die 1002 with the optical layer 1020 thereon may undergo additional post-processing steps to achieve desired surface finish and total thickness variation (TTV). For example, the optical layer 1020 may be lapped, polished, ground, or diamond-turned to achieve a desired surface finish.

COMPARATIVE EXAMPLES

As discussed above, the addition of one or more optical layers to a waveguide device can improve the optical characteristics of the waveguide device. To illustrate the optical improvements achieved by the addition of the optical layer, the following examples are provided.

Comparative Examples 1 and 2

Comparative examples 1 and 2 compared the optical efficiency of a waveguide device having an optical layer to a waveguide device not having an optical layer applied. In example 1, a waveguide device was used. The waveguide device did not have an optical layer applied.

In example 2, an optical layer was prepared and applied to a waveguide device. The waveguide device in example 2 is the same waveguide device as used in example 1. To apply the optical layer to the waveguide device, a monomer mixture was prepared. The monomer mixture was formed by adding MDTODT to XDI at a 1:1 molar ratio. Once the monomer mixture was formed, the monomer mixture was applied to the waveguide device according to the method described with respect to FIGS. 10A-10D. The monomer mixture was cured at a temperature of 120° C. for a duration of 60 minutes to form the optical layer on the waveguide device.

The waveguide devices of examples 1 and 2 were then tested for optical efficiency. To test for differences in optical efficiency, light was directed towards the waveguide on a first side of the waveguide and an image sensor was placed on a second, opposite side of the waveguide. The image sensor captured the brightness level of different ranges of light wavelengths. Specifically, the image sensor captured the light wavelengths corresponding to the red light spectrum, the green light spectrum, and the blue light spectrum.

Figure 11A:
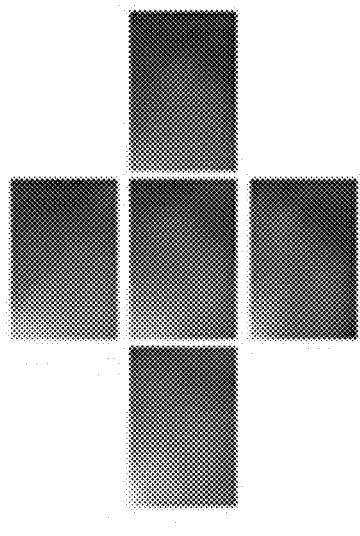
FIGS. 11A-11C depict images captured by an image sensor when testing a waveguide device having no optical layer applied, according to an comparative example.
Figure 11B:
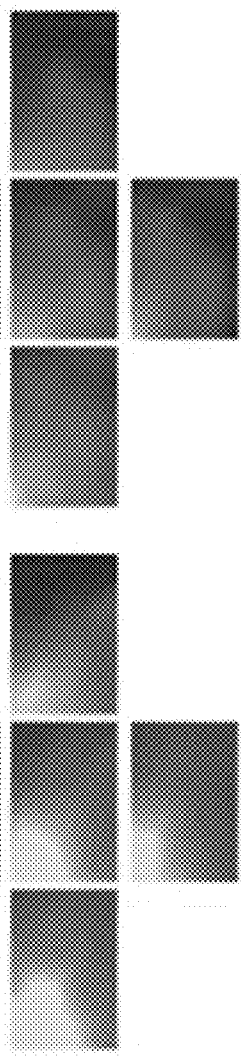
Figure 11C:
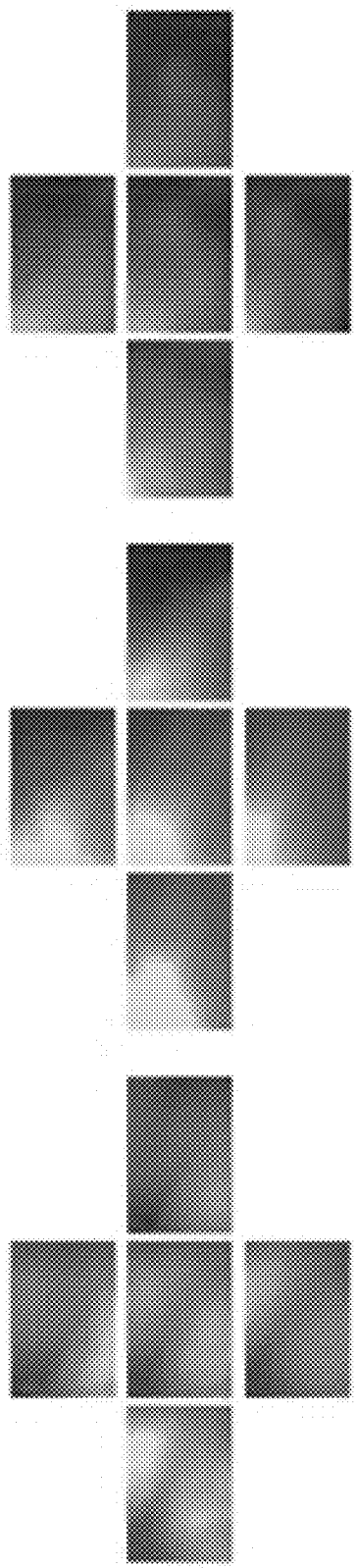

FIGS. 11A-C depict the images captured by the image sensor when testing the waveguide device of example 1 having no optical layer applied. Each one of FIGS. 11A-11C include five boxes corresponding to five different regions of the waveguide device from which light was captured by the image sensor. The whiter the image, the higher the intensity of light captured by the image sensor. The darker the image, the lower the intensity of light captured by the image sensor. A higher intensity of light indicates that the waveguide device is passing a higher degree of light wavelengths within the tested light spectrum, thereby having a higher optical efficiency. A lower intensity of light indicates that the waveguide device is reflecting a higher degree of light wavelengths within the tested light spectrum, thereby having a lower optical efficiency. As is understood by those skilled in the art, it is more desirable to have a higher intensity of light because this indicates that the waveguide has a higher transmission rate within the tested light spectrum.

FIG. 11A depicts images in the red light spectrum, FIG. 11B depicts images in the green spectrum, and FIG. 11C depicts images in the blue spectrum. As shown, the waveguide device had a low intensity of light transmission within the blue spectrum. Due to the shorter wavelengths within the blue spectrum, transmission of blue wavelengths is a common problem for waveguide devices. For example, commercially available products have a blue efficiency that is less than 0.1%. Although not at the same degree, the waveguide device of example 1 also had lower intensity of light transmission within the green wavelength than in the red spectrum.

Table 4 below provides data corresponding to the images of FIGS. 11A-11C. Zone A corresponds to the images in FIG. 11A, Zone B corresponds to the images in FIG. 11B, and Zone C corresponds to the images in FIG. 11C. As shown by the data in the table below, there is substantial variation in intensity of light transmission across an eyebox location. The 3 by 3 array of number provide a local uniformity reading for pupil positions in an eyebox location for a given field of view. Each Zone was tested for three fields of view. As shown, the intensity of light transmission varied across wavelength spectrum, local field of view uniformity at a given pupil position at a given field of view, and across the different fields of view.

TABLE 4

| Zone A (Input = 0, 0, 0%, EB1 = 0.186, 0.156, 0.045%) (Arithmetic Mean, Inclusive Zones) | | | | | | | | |
|---|---|---|---|---|---|---|---|---|
| 0.0 | 3.2 | 0.0 | 0.0 | 25.3 | 0.0 | 0.0 | 19.3 | 0.0 |
| 2.7 | 3.9 | 3.3 | 10.5 | 8.8 | 67.5 | 4.5 | 6.3 | 11.9 |
| 0.0 | 2.4 | 0.0 | 0.0 | 11.8 | 0.0 | 0.0 | 15.9 | 0.0 |
| Zone B (Input = 0, 0, 0%, EB1 = 0.214, 0.212, 0.052%) (Arithmetic Mean, Inclusive Zones) | | | | | | | | |
| 0.0 | 93.6 | 0.0 | 0.0 | 964.2 | 0.0 | 0.0 | 999.0 | 0.0 |
| 48.8 | 39.1 | 70.5 | 73.9 | 213.0 | 999.0 | 247.1 | 999.0 | 999.0 |
| 0.0 | 49.4 | 0.0 | 0.0 | 120.2 | 0.0 | 0.0 | 999.0 | 0.0 |
| Zone C (Input = 0, 0, 0%, EB1 = 0.195, 0.240, 0.059%) (Arithmetic Mean, Inclusive Zones) | | | | | | | | |
| 0.0 | 151.6 | 0.0 | 0.0 | 999.0 | 0.0 | 0.0 | 999.0 | 0.0 |
| 67.2 | 79.4 | 911.1 | 124.3 | 796.9 | 999.0 | 343.1 | 999.0 | 999.0 |
| 0.0 | 102.3 | 0.0 | 0.0 | 239.5 | 0.0 | 0.0 | 999.0 | 0.0 |

Figure 12A:
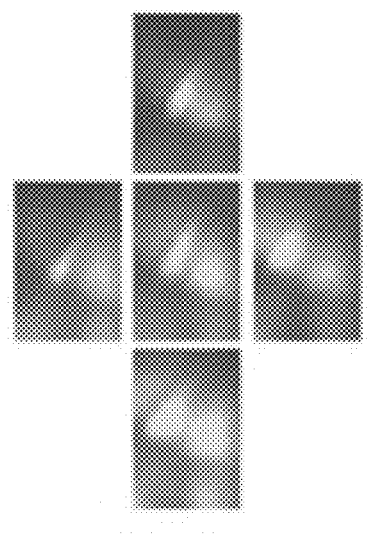
FIGS. 12A-12C depict images captured by an image sensor when testing a waveguide device having an optical layer applied, according to a comparative example.
Figure 12B:
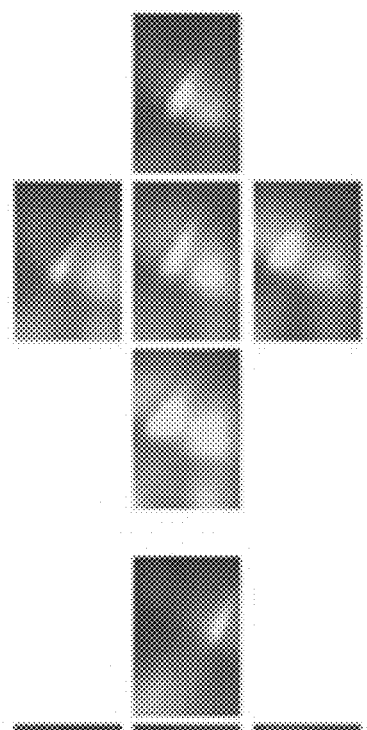
Figure 12C:
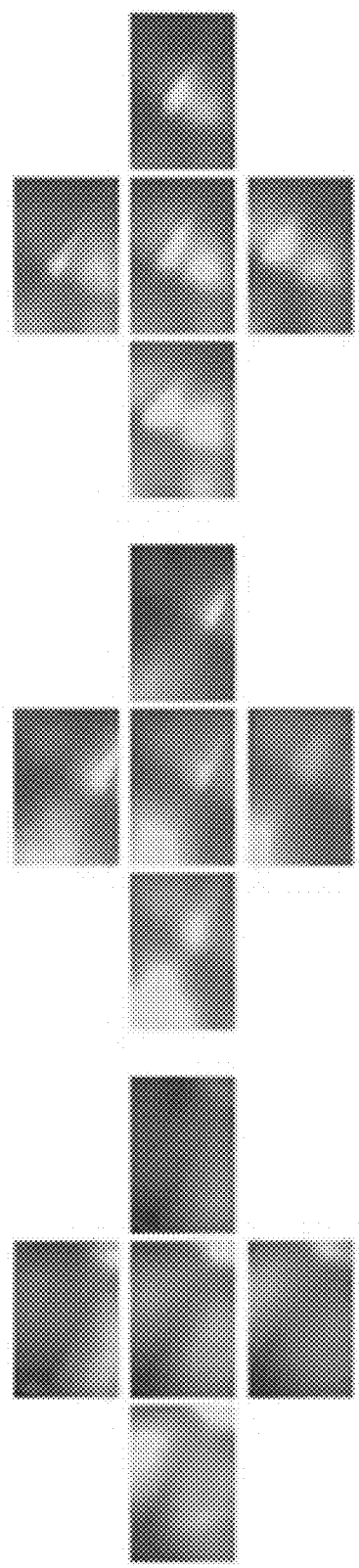

FIGS. 12A-C depict the images captured by the image sensor when testing the waveguide device of example 2 having an optical layer applied. FIG. 12A depicts images in the red light spectrum, FIG. 12B depicts images in the green spectrum, and FIG. 12C depicts images in the blue spectrum. As shown, waveguide device having the optical layer had increased intensity of light transmission within the green and blue spectrums as compared to the waveguide device of example 1.

Table 5 below provides data corresponding to the images of FIGS. 12A-12C. As shown, the waveguide device having an optical layer provided a more uniform transmission of light intensity across the different wavelength spectrums, local field of view uniformity at a given pupil position at a given field of view, and across the different fields of view.

TABLE 5

| Zone A (Input = 0, 0, 0%, EB1 = 0.175, 0.236, 0.547%) (Arithmetic Mean, Inclusive Zones) | | | | | | | | |
|---|---|---|---|---|---|---|---|---|
| 0.0 | 3.6 | 0.0 | 0.0 | 14.7 | 0.0 | 0.0 | 9.7 | 0.0 |
| 2.7 | 4.4 | 3.7 | 5.5 | 8.5 | 44.8 | 6.3 | 8.2 | 13.0 |
| 0.0 | 2.5 | 0.0 | 0.0 | 9.7 | 0.0 | 0.0 | 10.4 | 0.0 |
| Zone B (Input = 0, 0, 0%, EB1 = 0.204, 0.262, 0.283%) (Arithmetic Mean, Inclusive Zones) | | | | | | | | |
| 0.0 | 103.6 | 0.0 | 0.0 | 44.5 | 0.0 | 0.0 | 37.9 | 0.0 |
| 49.5 | 40.7 | 61.1 | 11.4 | 24.3 | 100.6 | 20.0 | 23.3 | 95.7 |
| 0.0 | 46.1 | 0.0 | 0.0 | 25.6 | 0.0 | 0.0 | 60.1 | 0.0 |
| Zone C (Input = 0, 0, 0%, EB1 = 0.199, 0.271, 0.254%) (Arithmetic Mean, Inclusive Zones) | | | | | | | | |
| 0.0 | 149.7 | 0.0 | 0.0 | 55.4 | 0.0 | 0.0 | 62.6 | 0.0 |
| 86.0 | 187.7 | 584.1 | 13.6 | 40.8 | 300.9 | 33.8 | 55.4 | 119.7 |
| 0.0 | 126.1 | 0.0 | 0.0 | 33.5 | 0.0 | 0.0 | 90.1 | 0.0 |

All patents, patent publications, patent applications, journal articles, books, technical references, and the like discussed in the instant disclosure are incorporated herein by reference in their entirety for all purposes.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. Embodiments recited as "including," "comprising," or "having" certain elements are also contemplated as "consisting essentially of" and "consisting of" those certain elements. As used herein, "and/or" refers to and encompasses any and all possible combinations of one or more of the associated listed items, as well as the lack of combinations where interpreted in the alternative ("or").

It is to be understood that the figures and descriptions of the disclosure have been simplified to illustrate elements that are relevant for a clear understanding of the disclosure. It should be appreciated that the figures are presented for illustrative purposes and not as construction drawings. Omitted details and modifications or alternative embodiments are within the purview of persons of ordinary skill in the art.

It can be appreciated that, in certain aspects of the disclosure, a single component may be replaced by multiple components, and multiple components may be replaced by a single component, to provide an element or structure or to perform a given function or functions. Except where such substitution would not be operative to practice certain embodiments of the disclosure, such substitution is considered within the scope of the disclosure.

The examples presented herein are intended to illustrate potential and specific implementations of the disclosure. It can be appreciated that the examples are intended primarily for purposes of illustration of the disclosure for those skilled in the art. There may be variations to these diagrams or the operations described herein without departing from the spirit of the disclosure. For instance, in certain cases, method steps or operations may be performed or executed in differing order, or operations may be added, deleted or modified.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications can be made without departing from the scope of the claims below.

What is claimed is:

1. A waveguide device for a head mounted display, the waveguide device comprising:
    a waveguide die, wherein the waveguide die comprises a first refractive index range; and
    a polymeric optical layer, wherein the polymeric optical layer comprises:
        a second refractive index range that is different from the first refractive index range; and
        a thiol-containing polymer.

2. The waveguide device of claim 1, wherein the thiol-containing polymer comprises thiourethane.

3. The waveguide device of claim 1, wherein the thiol-containing polymer is formed from a monomer mixture comprising:
    a thiol-containing compound; and
    an isocyanate.

4. The waveguide device of claim 3, wherein the thiol-containing compound comprises 4-mercaptomethyl-3,6-dithia-1,8-octanedithiol (MDTODT).

5. The waveguide device of claim 3, wherein the isocyanate comprises m-xylylene diisocyanate (XDI).

6. The waveguide device of claim 3, wherein the monomer mixture further comprises a second thiol-containing compound.

7. The waveguide device of claim 6, wherein the second thiol-containing compound comprises 1,3-benzene dithiol (1,3-BDT).

8. The waveguide device of claim 4, wherein the polymeric optical layer comprises a varying index optical layer having a refractive index gradient across a thickness of the polymeric optical layer.

9. The waveguide device of claim 1, wherein the polymeric optical layer comprises a plurality of polymeric optical layers, wherein each of the plurality of polymeric optical layers is a discretized layer having a different refractive index than an adjacent polymeric optical layer.

10. A method for forming a waveguide device, the method comprising:
    segmenting a wafer to obtain a waveguide die;
    dispensing a monomer mixture onto the waveguide die, wherein the monomer mixture comprises:
        a thiol-containing compound; and
        an isocyanate; and
    curing monomer mixture to form a polymeric optical layer on the waveguide.

11. The method of claim 10, wherein the thiol-containing compound comprises MDTODT.

12. The method of claim 10, wherein the isocyanate comprises XDI.

13. The method of claim 10, wherein the method further comprising adding a second thiol-containing compound to the monomer mixture prior to dispensing the monomer mixture onto the waveguide die.

14. The method of claim 10, wherein segmenting the wafer comprises dicing the wafer to obtain the waveguide die.

15. The method of claim 10, wherein the monomer mixture further comprises a catalyst.

16. The method of claim 15, wherein the catalyst comprises dibutyltin dichloride (DBTDC).

17. The method of claim 10 further comprising installing the waveguide device in a head-mounted display.

18. The method of claim 10 further comprising applying a planarization stamp to the dispensed monomer mixture before curing to set a thickness of the polymeric optical layer.

19. A polymeric optical layer for optical applications, wherein the polymeric optical layer comprises a thiol-containing polymer, wherein the thiol-containing polymer is formed from a monomer mixture comprising:
    a thiol-containing compound, wherein the thiol-containing compound comprises at least one of:
        4-mercaptomethyl-3,6-dithia-1,8-octanedithiol (MDTODT);
        bis(2-mercaptoethyl)sulfide (BMES); or
        1,3-benzene dithiol (1,3-BDT); and
    an isocyanate, wherein the isocyanate comprises at least one of:
        m-xylylene diisocyanate (XDI); or
        tetravinyl silane (TVSi),
    wherein the polymeric optical layer comprises:
        a thickness from 200 to 500 μm;
        a refractive index from 1.4-1.7 across the thickness of the polymeric optical layer; and
        an absorption, $\alpha$, that is less than or equal to 0.02 cm$^{-1}$.

20. The polymeric optical layer of claim 19, wherein the polymeric optical layer further comprises:
    a density, $\rho$, in a range from 0.1 to 2 g/cm$^3$; and
    a bidirectional scattering distribution function (BSDF) that is less than or equal to 0.001 sr$^{-1}$.

* * * * *